United States Patent
Friedlander et al.

(10) Patent No.: US 9,646,271 B2
(45) Date of Patent: May 9, 2017

(54) GENERATING CANDIDATE INCLUSION/EXCLUSION COHORTS FOR A MULTIPLY CONSTRAINED GROUP

(75) Inventors: Robert R. Friedlander, Southbury, CT (US); German S. Goldszmidt, Dobbs Ferry, NY (US); James R. Kraemer, Santa Fe, NM (US); Robin Lougee, Yorktown Heights, NY (US); Kirill M. Osipov, Ormond Beach, FL (US)

(73) Assignee: International Business Machines Corporation, Armonk, NY (US)

(*) Notice: Subject to any disclaimer, the term of this patent is extended or adjusted under 35 U.S.C. 154(b) by 1424 days.

(21) Appl. No.: 12/851,995

(22) Filed: Aug. 6, 2010

(65) Prior Publication Data
US 2012/0035971 A1 Feb. 9, 2012

(51) Int. Cl.
*G06Q 10/00* (2012.01)
*G06Q 10/06* (2012.01)
*G06F 17/30* (2006.01)

(52) U.S. Cl.
CPC . *G06Q 10/06311* (2013.01); *G06F 17/30864* (2013.01); *G06Q 10/063112* (2013.01)

(58) Field of Classification Search
CPC ........ G06Q 10/06311; G06Q 10/06312; G06F 17/30864
USPC ................. 705/7.22, 7.23; 709/223
See application file for complete search history.

(56) References Cited

U.S. PATENT DOCUMENTS

| | | | |
|---|---|---|---|
| 2,671,443 A | 3/1954 | Holland | |
| 3,711,152 A | 1/1973 | Sirpak et al. | |
| 4,803,625 A | 2/1989 | Fu et al. | |
| 4,883,063 A | 11/1989 | Bernard et al. | |
| 4,890,227 A | 12/1989 | Watanabe et al. | |
| 5,024,225 A | 6/1991 | Fang | |
| 5,070,453 A | 12/1991 | Duffany | |
| 5,111,391 A * | 5/1992 | Fields et al. | 705/7.14 |
| 5,128,871 A | 7/1992 | Schmitz | |
| 5,148,365 A | 9/1992 | Dembo | |
| 5,167,230 A | 12/1992 | Chance | |
| 5,216,593 A | 6/1993 | Dietrich et al. | |
| 5,590,648 A | 1/1997 | Mitchell et al. | |
| 5,601,435 A | 2/1997 | Quy | |
| 5,764,740 A | 6/1998 | Holender | |
| 5,838,918 A | 11/1998 | Prager et al. | |

(Continued)

OTHER PUBLICATIONS

T. Vercauteren et al., "Hierarchical Forecasting of Web Server Workload Using Sequential Monte Carlo Training", IEEE Transactions on Signal Processing, vol. 55, No. 4, pp. 1286-1297, Apr. 2007.

(Continued)

*Primary Examiner* — Matthew Gart
*Assistant Examiner* — Stephen S Swartz
(74) *Attorney, Agent, or Firm* — John R. Pivnichny; Law Office of Jim Boice

(57) ABSTRACT

A computer implemented method, program product, and/or system allocate human resources to a cohort. At least one attribute held by each member of a group of human resources is identified. A request is received, from a planned cohort, for multiple human resources that collectively possess a set of predefined attributes, wherein no single human resource possesses all of the predefined attributes. The set of human resources that satisfies the request is identified and assigned to the planned cohort.

17 Claims, 4 Drawing Sheets

(56) References Cited

U.S. PATENT DOCUMENTS

| | | | |
|---|---|---|---|
| 5,880,598 A | 3/1999 | Duong | |
| 6,021,403 A | 2/2000 | Horvitz et al. | |
| 6,049,776 A * | 4/2000 | Donnelly et al. | 705/7.14 |
| 6,076,166 A | 6/2000 | Moshfeghi et al. | |
| 6,102,856 A | 8/2000 | Groff et al. | |
| 6,144,837 A | 11/2000 | Quy | |
| 6,164,975 A | 12/2000 | Weingarden et al. | |
| 6,212,524 B1 | 4/2001 | Weissman et al. | |
| 6,272,483 B1 | 8/2001 | Joslin et al. | |
| 6,289,340 B1 * | 9/2001 | Puram et al. | 705/7.14 |
| 6,321,207 B1 | 11/2001 | Ye | |
| 6,381,577 B1 | 4/2002 | Brown | |
| 6,449,641 B1 | 9/2002 | Moiin et al. | |
| 6,466,232 B1 | 10/2002 | Newell et al. | |
| 6,484,155 B1 | 11/2002 | Kiss et al. | |
| 6,578,068 B1 * | 6/2003 | Bowman-Amuah | 709/203 |
| 6,604,160 B1 | 8/2003 | Le et al. | |
| 6,647,374 B2 | 11/2003 | Kansal | |
| 6,675,159 B1 | 1/2004 | Lin et al. | |
| 6,885,936 B2 | 4/2005 | Yashio et al. | |
| 6,889,137 B1 | 5/2005 | Rychlak | |
| 6,905,816 B2 | 6/2005 | Jacobs et al. | |
| 6,937,147 B2 | 8/2005 | Dilbeck et al. | |
| 6,954,736 B2 | 10/2005 | Menninger et al. | |
| 7,149,533 B2 | 12/2006 | Laird et al. | |
| 7,181,428 B2 | 2/2007 | Lawrence | |
| 7,213,009 B2 | 5/2007 | Pestotnik et al. | |
| 7,221,928 B2 | 5/2007 | Laird et al. | |
| 7,243,024 B2 | 7/2007 | Endicott | |
| 7,295,925 B2 | 11/2007 | Breed et al. | |
| 7,319,386 B2 | 1/2008 | Collins et al. | |
| 7,343,316 B2 * | 3/2008 | Goto et al. | 705/7.16 |
| 7,400,257 B2 | 7/2008 | Rivas | |
| 7,403,922 B1 | 7/2008 | Lewis et al. | |
| 7,457,764 B1 * | 11/2008 | Bullock et al. | 705/7.14 |
| 7,460,019 B2 | 12/2008 | Henderson | |
| 7,464,147 B1 | 12/2008 | Fakhouri et al. | |
| 7,516,142 B2 | 4/2009 | Friedlander et al. | |
| 7,523,118 B2 | 4/2009 | Friedlander et al. | |
| 7,539,533 B2 | 5/2009 | Tran | |
| 7,539,623 B1 | 5/2009 | Wyatt | |
| 7,542,878 B2 | 6/2009 | Nanikashvili | |
| 7,558,745 B2 * | 7/2009 | Cullen et al. | 705/26.3 |
| 7,584,160 B2 | 9/2009 | Friedlander et al. | |
| 7,630,948 B2 | 12/2009 | Friedlander et al. | |
| 7,630,986 B1 | 12/2009 | Herz et al. | |
| 7,647,288 B2 | 1/2010 | Friedlander et al. | |
| 7,693,736 B1 * | 4/2010 | Chu et al. | 705/7.19 |
| 7,702,605 B2 | 4/2010 | Friedlander et al. | |
| 7,739,606 B2 * | 6/2010 | Sawada et al. | 715/740 |
| 7,752,154 B2 | 7/2010 | Friedlander et al. | |
| 7,801,885 B1 | 9/2010 | Verma | |
| 7,930,262 B2 | 4/2011 | Friedlander et al. | |
| 7,933,228 B2 * | 4/2011 | Coley | 370/278 |
| 7,935,076 B2 | 5/2011 | Estes et al. | |
| 7,937,214 B2 | 5/2011 | Kaneda et al. | |
| 8,001,008 B2 | 8/2011 | Engle | |
| 8,010,516 B2 * | 8/2011 | Ishii et al. | 707/705 |
| 8,045,455 B1 | 10/2011 | Agronow et al. | |
| 8,055,603 B2 | 11/2011 | Angell et al. | |
| 8,126,882 B2 * | 2/2012 | Lawyer | G06Q 10/063 705/7.11 |
| 8,204,779 B1 * | 6/2012 | Hughes et al. | 705/7.39 |
| 8,207,859 B2 | 6/2012 | Enegren et al. | |
| 8,207,860 B2 | 6/2012 | Enegren et al. | |
| 2001/0034632 A1 | 10/2001 | Wilkinson | |
| 2001/0039373 A1 | 11/2001 | Cunningham et al. | |
| 2001/0051765 A1 | 12/2001 | Walker et al. | |
| 2002/0019764 A1 | 2/2002 | Mascarenhas | |
| 2002/0029161 A1 * | 3/2002 | Brodersen | G06Q 10/06 705/7.14 |
| 2002/0035572 A1 | 3/2002 | Takatori et al. | |
| 2002/0052756 A1 | 5/2002 | Lomangino | |
| 2002/0059201 A1 | 5/2002 | Work | |
| 2002/0107824 A1 | 8/2002 | Ahmed et al. | |
| 2002/0111922 A1 | 8/2002 | Young et al. | |
| 2002/0115447 A1 | 8/2002 | Martin et al. | |
| 2002/0182573 A1 | 12/2002 | Watson | |
| 2003/0033180 A1 | 2/2003 | Shekar et al. | |
| 2003/0065544 A1 | 4/2003 | Elzinga et al. | |
| 2003/0088491 A1 | 5/2003 | Liu et al. | |
| 2003/0092976 A1 | 5/2003 | Murase et al. | |
| 2003/0097291 A1 | 5/2003 | Freedman | |
| 2003/0140063 A1 | 7/2003 | Pizzorno et al. | |
| 2003/0177038 A1 | 9/2003 | Rao | |
| 2003/0220830 A1 | 11/2003 | Myr | |
| 2003/0220860 A1 | 11/2003 | Heytens et al. | |
| 2004/0006694 A1 | 1/2004 | Heelan et al. | |
| 2004/0122787 A1 | 6/2004 | Avinash et al. | |
| 2004/0155772 A1 | 8/2004 | Medema et al. | |
| 2004/0155815 A1 | 8/2004 | Muncaster et al. | |
| 2004/0199056 A1 | 10/2004 | Husemann et al. | |
| 2004/0243422 A1 * | 12/2004 | Weber et al. | 705/1 |
| 2004/0267595 A1 * | 12/2004 | Woodings et al. | 705/9 |
| 2005/0004823 A1 | 1/2005 | Hnatio | |
| 2005/0004828 A1 | 1/2005 | DeSilva et al. | |
| 2005/0037730 A1 | 2/2005 | Montague | |
| 2005/0038608 A1 | 2/2005 | Chandra et al. | |
| 2005/0080806 A1 | 4/2005 | Doganata et al. | |
| 2005/0085257 A1 | 4/2005 | Laird et al. | |
| 2005/0101873 A1 | 5/2005 | Misczynski et al. | |
| 2005/0144062 A1 | 6/2005 | Mittal et al. | |
| 2005/0149466 A1 | 7/2005 | Hale et al. | |
| 2005/0165594 A1 | 7/2005 | Chandra et al. | |
| 2005/0198486 A1 * | 9/2005 | Desmond et al. | 713/1 |
| 2005/0222989 A1 | 10/2005 | Haveliwala et al. | |
| 2005/0240668 A1 | 10/2005 | Rolia et al. | |
| 2006/0010090 A1 | 1/2006 | Brockway et al. | |
| 2006/0023848 A1 | 2/2006 | Mohler et al. | |
| 2006/0031110 A1 | 2/2006 | Benbassat et al. | |
| 2006/0036560 A1 | 2/2006 | Fogel | |
| 2006/0069514 A1 | 3/2006 | Chow et al. | |
| 2006/0105830 A1 | 5/2006 | Nemitz et al. | |
| 2006/0118541 A1 | 6/2006 | Ellis et al. | |
| 2006/0155627 A1 | 7/2006 | Horowitz | |
| 2006/0184412 A1 | 8/2006 | Kagan et al. | |
| 2006/0194186 A1 | 8/2006 | Nanda | |
| 2006/0200435 A1 | 9/2006 | Flinn et al. | |
| 2006/0206724 A1 | 9/2006 | Schaufele et al. | |
| 2006/0208169 A1 | 9/2006 | Breed et al. | |
| 2006/0218010 A1 | 9/2006 | Michon et al. | |
| 2006/0226991 A1 | 10/2006 | Rivas | |
| 2006/0294085 A1 | 12/2006 | Rose et al. | |
| 2007/0073654 A1 | 3/2007 | Chow et al. | |
| 2007/0073754 A1 | 3/2007 | Friedlander et al. | |
| 2007/0073799 A1 | 3/2007 | Adjali et al. | |
| 2007/0112261 A1 | 5/2007 | Enegren et al. | |
| 2007/0112735 A1 | 5/2007 | Holloway et al. | |
| 2007/0124058 A1 | 5/2007 | Kitagawa et al. | |
| 2007/0150325 A1 * | 6/2007 | Bjornson | 705/7 |
| 2007/0160964 A1 * | 7/2007 | Albertsson | G06Q 10/105 434/219 |
| 2007/0168307 A1 | 7/2007 | Floudas et al. | |
| 2007/0174090 A1 | 7/2007 | Friedlander et al. | |
| 2007/0174091 A1 | 7/2007 | Friedlander et al. | |
| 2007/0174101 A1 | 7/2007 | Li et al. | |
| 2007/0179356 A1 | 8/2007 | Wessel | |
| 2007/0185737 A1 | 8/2007 | Friedlander et al. | |
| 2007/0203872 A1 | 8/2007 | Flinn et al. | |
| 2007/0244701 A1 | 10/2007 | Erlanger et al. | |
| 2007/0250361 A1 * | 10/2007 | Hazy | G06Q 10/00 705/7.36 |
| 2007/0274337 A1 | 11/2007 | Purpura | |
| 2008/0015422 A1 | 1/2008 | Wessel | |
| 2008/0015871 A1 | 1/2008 | Eder | |
| 2008/0028409 A1 | 1/2008 | Cherkasova et al. | |
| 2008/0065576 A1 | 3/2008 | Friedlander et al. | |
| 2008/0077463 A1 | 3/2008 | Friedlander et al. | |
| 2008/0082356 A1 * | 4/2008 | Friedlander | G06F 19/327 705/2 |
| 2008/0082374 A1 | 4/2008 | Kennis et al. | |
| 2008/0147694 A1 | 6/2008 | Ernest et al. | |
| 2008/0155104 A1 | 6/2008 | Quinn et al. | |
| 2008/0167929 A1 | 7/2008 | Cao et al. | |

(56) References Cited

U.S. PATENT DOCUMENTS

| | | |
|---|---|---|
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0189402 A1 | 8/2008 | Betzler et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |
| 2008/0208838 A1 | 8/2008 | Friedlander et al. |
| 2008/0208875 A1 | 8/2008 | Friedlander et al. |
| 2008/0208901 A1 | 8/2008 | Friedlander et al. |
| 2008/0208902 A1 | 8/2008 | Friedlander et al. |
| 2008/0208903 A1 | 8/2008 | Friedlander et al. |
| 2008/0208904 A1 | 8/2008 | Friedlander et al. |
| 2008/0209493 A1 | 8/2008 | Choi et al. |
| 2008/0221419 A1 | 9/2008 | Furman |
| 2008/0242509 A1 | 10/2008 | Menektchiev et al. |
| 2008/0246629 A1 | 10/2008 | Tsui et al. |
| 2008/0275321 A1 | 11/2008 | Furman |
| 2008/0281974 A1 | 11/2008 | Slothouber et al. |
| 2008/0288862 A1* | 11/2008 | Smetters et al. .............. 715/255 |
| 2008/0294459 A1 | 11/2008 | Angell et al. |
| 2008/0294692 A1 | 11/2008 | Angell et al. |
| 2009/0024553 A1 | 1/2009 | Angell et al. |
| 2009/0069787 A1 | 3/2009 | Estes et al. |
| 2009/0089149 A1 | 4/2009 | Lerner et al. |
| 2009/0106179 A1 | 4/2009 | Friedlander et al. |
| 2009/0112670 A1* | 4/2009 | Black et al. ...................... 705/7 |
| 2009/0138300 A1 | 5/2009 | Kagan et al. |
| 2009/0140923 A1 | 6/2009 | Graves et al. |
| 2009/0198696 A1 | 8/2009 | Banks |
| 2009/0198733 A1 | 8/2009 | Gounares et al. |
| 2009/0267774 A1 | 10/2009 | Enegren et al. |
| 2009/0267775 A1 | 10/2009 | Enegren et al. |
| 2009/0270705 A1 | 10/2009 | Enegren et al. |
| 2009/0287503 A1 | 11/2009 | Angell et al. |
| 2009/0287674 A1 | 11/2009 | Bouillet et al. |
| 2009/0287683 A1 | 11/2009 | Bennett |
| 2009/0299766 A1 | 12/2009 | Friedlander et al. |
| 2009/0299928 A1 | 12/2009 | Kongtcheu |
| 2010/0010832 A1 | 1/2010 | Boute et al. |
| 2010/0042456 A1 | 2/2010 | Stinchcombe et al. |
| 2010/0056643 A1 | 3/2010 | Bachynsky et al. |
| 2010/0057655 A1 | 3/2010 | Jacobson et al. |
| 2010/0063877 A1 | 3/2010 | Soroca et al. |
| 2010/0077438 A1 | 3/2010 | Ansari |
| 2010/0131028 A1 | 5/2010 | Hsu et al. |
| 2010/0191516 A1 | 7/2010 | Benish et al. |
| 2010/0223581 A1 | 9/2010 | Manolescu et al. |
| 2010/0228715 A1 | 9/2010 | Lawrence |
| 2010/0274770 A1* | 10/2010 | Gupta ............... G06F 17/30598 707/688 |
| 2011/0054968 A1* | 3/2011 | Galaviz ......................... 705/7.28 |
| 2011/0093287 A1 | 4/2011 | Dicks et al. |
| 2011/0131082 A1* | 6/2011 | Manser .................. G06Q 10/06 705/7.42 |
| 2011/0190579 A1 | 8/2011 | Ziarno et al. |
| 2011/0213655 A1* | 9/2011 | Henkin .................. G06Q 30/00 705/14.49 |
| 2011/0246055 A1 | 10/2011 | Huck et al. |
| 2011/0251790 A1 | 10/2011 | Liotopoulos et al. |
| 2011/0275480 A1 | 11/2011 | Champsaur |
| 2011/0275907 A1 | 11/2011 | Inciardi et al. |
| 2012/0108984 A1 | 5/2012 | Bennett et al. |
| 2012/0245479 A1 | 9/2012 | Ganesh et al. |
| 2013/0096966 A1 | 4/2013 | Barnes, Jr. |
| 2013/0109997 A1 | 5/2013 | Linke et al. |

OTHER PUBLICATIONS

P. Palazzari et al., "Synthesis of Pipelined Systems for the Contemporaneous Execution of Periodic and Aperiodic Tasks With Hard Real-Time Constraints", 18th International Parallel and Distributed Processing Symposium, 121. IEEE Comput. Soc, Los Alamitos, CA, USA, 2004, pp. LVI-289.

RL Dillon et al., "Optimal Use of Budget Reserves to Minimize Technical and Management Failure Risks During Complex Project Development", IEEE Transactions on Engineering Management, vol. 52, No. 3, pp. 382-395, Aug. 2005.

K. Vanthournout et al., "A Taxonomy for Resource Discovery", PERS Ubiquit Comput 9, pp. 81-89, 2005.

C. Srisuwanrat et al., "Optimal Scheduling of Probabilistic Repetitive Projects Using Completed Unit and Genetic Algorithms", Proceedings of the 2007 Winter Simulation Conference, pp. 2151-2158, 2007.

S. Bharathi et al., "Scheduling Data-Intensive Workflows on Storage Constrained Resources", Works 09, Portland, OR, pp. 1-10 Nov. 15, 2009.

J. Redondo et al., "Solving the Multiple Competitive Facilities Location and Design Problem on the Plane", Massachusetts Institute of Technology, Evolutionary Computation, vol. 17, No. 1, pp. 21-53, 2009.

H. Van et al., "Autonomic Virtual Resource Management for Service Hosting Platforms", Cloud'09, pp. 1-8 , May 23, 2009.

U.S. Appl. No. 12/795,847, Specification filed Jun. 8, 2010.

U.S. Appl. No. 12/903,376—Non-Final Office Action Mailed Jul. 30, 2012.

U.S. Appl. No. 12/875,261—Notice of Allowance Mailed Sep. 27, 2012.

Phillip E. Hayes et al., "Picking Up the Pieces: Utilizing Disaster Recovery Project Management to Improve Readiness and Response Time," IEEE Industry Applications Magazine, Nov./Dec. 2002, pp. 1-10 (Abstract).

Kun Wang et al., "A Mathematical Approach to Disaster Recovery Planning," Proceedings of the First International Conference on Semantics, Knowledge, and Grid, 2005, pp. 1-3 (Abstract).

E. A. Silver, "An Overview of Heuristic Solution Methods," The Journal of the Operational Research Society, vol. 55, No. 9, Sep. 2004, pp. 936-956 (Abstract).

Smith et al., "Collaborative Approaches to Research," HEFCE Fundamental Review of Research Policy and Planning, Final Report, Apr. 2000, pp. 1-117.

William E. Souder, "Analytical Effectiveness of Mathematical Models for R&D Project Selection," Management Science, vol. 19, No. 8, Application Seires, Apr. 1973, pp. 907-923 (Abstract).

J. Altmann et al., "Cooperative Software Development: Concepts, Model and Tools," Technology of Object-Oriented Languages and Systems, 1999, pp. 1-14.

Shou-Qi Cao et al., "Research on Resource Scheduling for Development Process of Complicated Product," Computer Supported Cooperative Work in Design, 2005. Proceedings of the Ninth International Conference on, vol. 1, pp. 229-233 (Abstract).

Ming Chen et al., "Research on Organization Method of Development Activities for Complicated Product," Computer Supported Cooperative Work in Design, 2005. Proceedings of the Ninth International Conference on, vol. 1, pp. 234-239 (Abstract).

Luckham et al., "Event Processing Glossary," Jul. 2008, pp. 1-19. http://complexevents.com.

Dept of Health and Human Services Agency for Healthcare Research and Quality, "AHRQ Quality Indicators—Patient Safety Indicators—Technical Specifications," 2012, pp. 1-149. http://www.qualityindicators.ahrq.gov.

Wong et al., "Rule-Based Anomaly Pattern Detection for Detecting Disease Outbreaks," AAAI-02 Proceedings, 2002, pp. 1-7.

Grzymala-Busse, "Knowledge Acquisition Under Uncertainty—A Rough Set Approach," Journal of Intelligent and Robotic Systems, 1988 (Abstract).

Schadow et al., "Discussion Paper: Privacy-Preserving Distributed Queries for a Clinical Case Research Network," IEE International Conference on Data Mining Workshop on Privacy, Security, and Data Mining, 2002 (Abstract).

U.S. Appl. No. 13/253,431—Non-Final Office Action Mailed Sep. 11, 2013.

(56) References Cited

OTHER PUBLICATIONS

Nih Article, "Agepage—Hyperthermia: Too Hot for Your Health", National Institute on Aging, National Institutes of Health, Jul. 2010, pp. 1-4.
U.S. Appl. No. 13/253,431—Notice of Allowance mailed Oct. 22, 2014.
Bashur et al., "TeleMedicine: A New Health Care Delivery System", Annual Reviews Public Health 21 (2000): pp. 613-637, 2000.
Blumrosen et al., "New Wearable Body Sensor for Continuous Diagnosis of Internal Tissue Bleeding", in Proceedings of the 2009 Sixth International Workshop on Wearable and Implantable Body Sensor Networks, 5 pages, 2009.
Gao et al., "Vital Signs Monitoring and Patient Tracking Over a Wireless Network", in Proceedings of the 27th Annual International Conference of the IEEE EMBS, Shanghai, Sep. 2005, 4 pages.
Hong et al., "A Wireless 3-Channel ECG Transmission System Using PDA Phone", 2007 International Conference on Convergence Information Technology, IEEE Computer Society, pp. 462-465, 2007.
Milenkovic et al., "Wireless Sensor Networks for Personal Health Monitoring: Issues and an Implementation", Computer Communications 29 (2006): pp. 2521-2533, 2006.
Morton et al., "Importance of Emergency Identification Schemes", Emergency Medicine Journal 2002; 19: pp. 584-586, 2002.
Shin et al., "Ubiquitous House and Unconstrained Monitoring Devices for Home Healthcare System", in Proceedings of the 6th International Special Topic Conference on ITAB, 2007, Tokyo, pp. 201-204.
U.S. Appl. No. 12/884,665—Examiner's Answer Mailed May 16, 2013.
U.S. Appl. No. 12/795,847—Notice of Allowance Mailed Jun. 5, 2013.
U.S. Appl. No. 13/253,431—Final Office Action Mailed May 21, 2013.
U.S. Appl. No. 12/884,665—Final Office Action Mailed Oct. 18, 2012.
U.S. Appl. No. 12/795,847—Non-Final Office Action Mailed Nov. 26, 2012.
U.S. Appl. No. 12/903,376—Notice of Allowance Mailed Dec. 19, 2012.
U.S. Appl. No. 13/253,431—Non-Final Office Action Mailed Jan. 3, 2013.
U.S. Appl. No. 13/253,431—Specification Filed Oct. 5, 2011.
U.S. Appl. No. 12/903,376—Specification Filed Oct. 13, 2010.
U.S. Appl. No. 12/875,261—Specification Filed Sep. 3, 2010.
U.S. Appl. No. 12/884,665—Specification Filed Sep. 17, 2010.
U.S. Appl. No. 12/875,261—Non-Final Office Action Mailed Feb. 14, 2012.
U.S. Appl. No. 12/884,665—Non-Final Office Action Mailed Apr. 11, 2012.
U.S. Appl. No. 13/253,431—Non-Final Office Action Mailed Nov. 10, 2011.
U.S. Appl. No. 13/253,431—Non-Final Office Action Mailed Mar. 31, 2014.
Mordecai, M. "Physiological Stats Monitoring for Firefighters: Watching Out for Overexertion Before It's Too Late", firerescue1.com, Jun. 18, 2008, pp. 1-4.

\* cited by examiner

GENERATING CANDIDATE INCLUSION/EXCLUSION COHORTS FOR A MULTIPLY CONSTRAINED GROUP

BACKGROUND

The present disclosure relates to the field of computers, and specifically to the use of computers in allocating human resources. Still more particularly, the present disclosure relates to the use of computers to allocate human resources to cohorts used by a workgroup.

BRIEF SUMMARY

A computer implemented method, program product, and/or system allocate human resources to a cohort. At least one attribute held by each member of a group of human resources is identified. A request is received, from a planned cohort, for multiple human resources that collectively possess a set of predefined attributes, wherein no single human resource possesses all of the predefined attributes. The set of human resources that satisfies the request is identified and assigned to the planned cohort.

DETAILED DESCRIPTION

Figure 1:
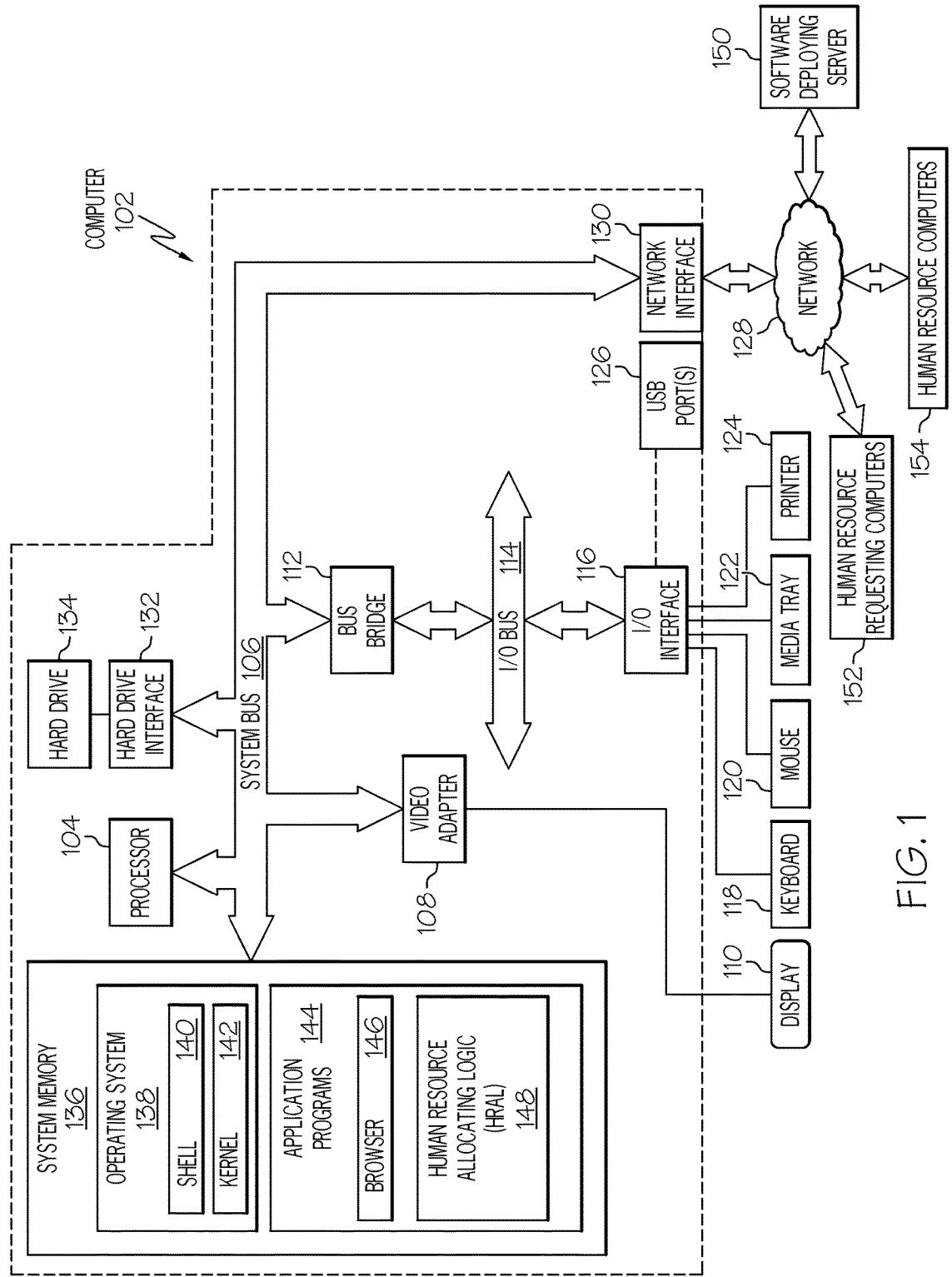
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, human resource requesting computers 152 and/or human resource computers 154.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, human resource requesting computers 152, and/or human resource computers 154 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a human resource allocating logic (HRAL) 148. HRAL 148 includes code for implementing the processes described below, including those described in FIGS. 2-4. In one embodiment, computer 102 is able to download HRAL 148 from software deploying server 150, including in an on-demand basis, wherein the code in HRAL 148 is not downloaded until needed for execution to define and/or implement the improved enterprise architecture described herein. Note further that, in one embodiment of the present invention, software deploying server 150 performs all of the functions associated with the present invention (including execution of HRAL 148), thus freeing computer 102 from having to use its own internal computing resources to execute HRAL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
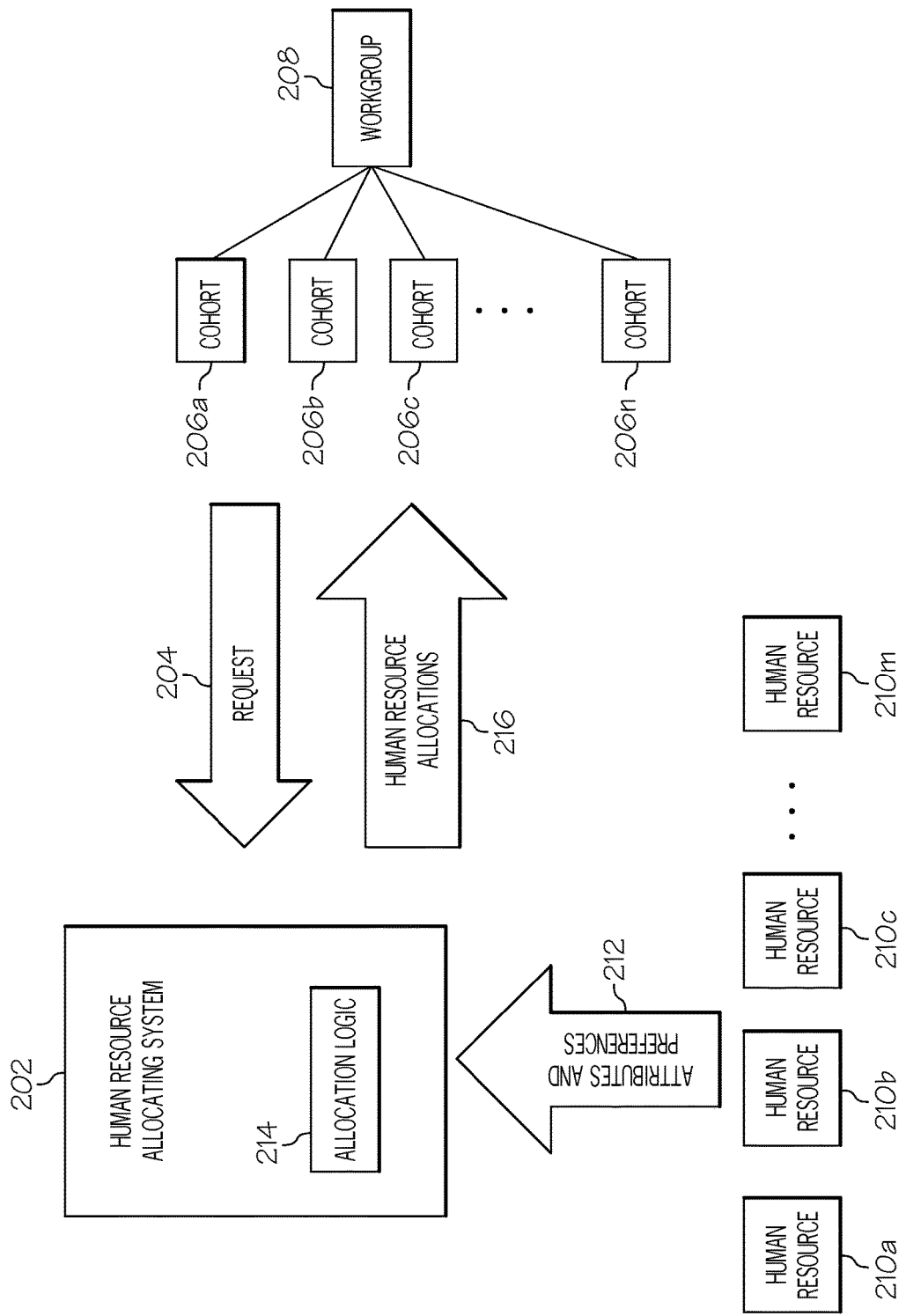
FIG. 2 illustrates relationships among a resource allocating system, multiple cohorts, and multiple human resources.

Referring now to FIG. 2, a relationship among a human resource allocating system 202 (e.g., computer 102 shown in FIG. 1), multiple cohorts 206a-n (where "n" is an integer), and multiple human resources 210a-m (where "m" is an integer) is presented. A "cohort" is defined as a group of individuals that, when combined, provide some predefined functionality. For example, a cohort may be a group of professionals that, collectively, are able to analyze a set of medical research data. In another example, a cohort may be a group of workers that are able to receive orders for a product, while another cohort is a group of dispatchers and drivers that can deliver this product. Note that a workgroup 208 can be made up of multiple cohorts, where each cohort performs one or more predefined functions.

Assume that workgroup 208 is assigned to a particular project. Workgroup 208 can plan on having multiple cohorts to perform sub-processes of that project. As such, these planned cohorts send the human resource allocating system 202 a request 204. Request 204 is from one of the cohorts 206a-n (e.g., using one of the human resource requesting computers 152 shown in FIG. 1), and requests multiple human resources that collectively possess a set of predefined attributes. These attributes, as well as preferences (discussed below) of human resources 210a-m, are sent as attributes and preferences 212 from one or more of the human resources 210a-m (e.g., using one of the human resource computer 154) to the human resource allocating system 202, which executes allocation logic 214 (e.g., one or more components of HRAL 148 shown in FIG. 1). Based on the attributes and preferences 212, the allocation logic 214 then allocates/assigns a set of human resource allocations 216 to each requesting planned cohort (i.e., one or more of elements 206a-n).

Figure 3:
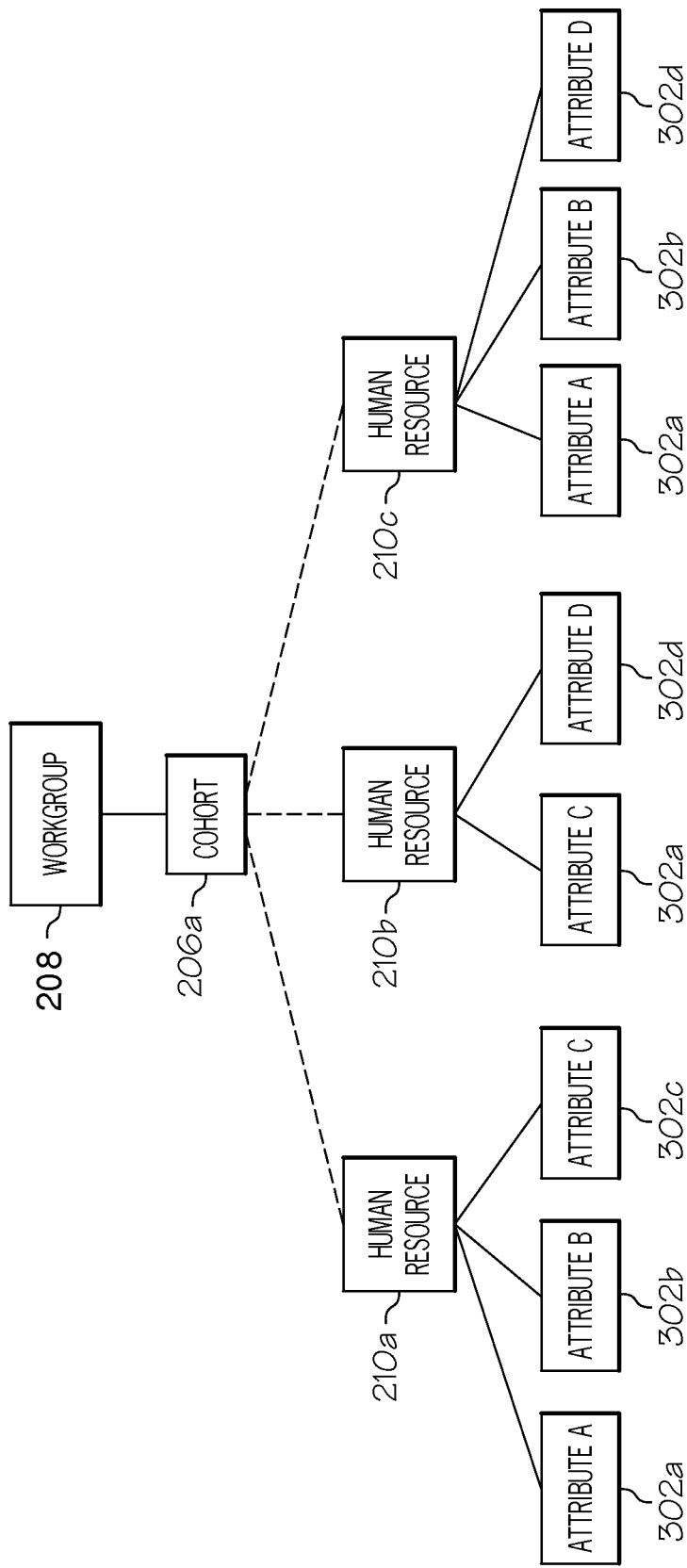
FIG. 3 depicts exemplary attributes that are attributed to each human resource.

With reference now to FIG. 3, note that each human resource (from elements 210a-m shown in FIG. 2) possess one or more attributes. For example, human resource 210a holds attributes 302a, 302b, and 302c; human resource 210b holds attributes 302a and 302d; and human resource 210c holds attributes 302a, 302b, and 302d. Examples of such attributes include, but are not limited to, a specific type of license or certification (e.g., a medical license, a law license (e.g., from a state, federal, or patent bar), a commercial driver's license, certification in a technical area, etc.) held by the human resource; a predefined level of education (e.g., a postgraduate-level engineering degree, a medical degree, a law degree, etc.) of a human resource; a medical condition (e.g., being afflicted with a type of disease being studied in a research project, a lack of a medical illness that may conflict with a medical research project, being a non-smoker, etc.) of a human resource; a life experience (e.g., based on a person's travel experiences, work history, etc.) of a human resource; etc. Note that the attributes may be negative requirements, such as no driving while intoxicated charges if looking for a driver, a lack of certain medical conditions that might interfere with a medical research project, etc.

Assume now that a project to which workgroup 208 has been assigned requires a cohort (e.g., cohort 206a) to include human resources that collectively have attributes A-D (where no individual human resource has all of these attributes). This scenario provides three possible solutions: human resource 210a (who has attributes A, B, C) combined with human resource 210b (who has duplicate attribute C along with needed attribute D); human resource 210a (who has attributes A, B, C) combined with human resource 210c (who has duplicate attributes A and B along with needed attribute D); human resource 210b (who has attributes C and D) combined with human resource 210c (who has duplicate attribute D along with needed attributes A and B). A processor can decide which of these combinations to use by applying other constraints to the problem.

For example, assume that human resource 210a has been assigned a weight that is higher than the weight held by human resource 210b. This weight describes how valuable each human resource is to the planned cohort 206a and/or workgroup 208 and/or the project. The weight can be based on a set of predefined attributes needed by the cohort/workgroup/project. Thus, since human resource 210a and human resource 210c have more needed attributes than human resource 210b, then one of human resource 210a or human resource 210c will be assigned to the planned cohort 206a. Since human resource 210a or human resource 210c have the same number of attributes, the "tie" can be broken based on several factors. In one embodiment, the different attributes are given different weights (based on how significant they are to the project). Thus, if attribute 302d has a higher significance weight than attribute 302a or attribute 302b, then human resource 210c would be selected to be combined with human resource 210b to make up cohort 206a.

In one embodiment, features, related to a particular individual, beyond those defined by attributes 302a-d may determine which human resources are used to create cohort 206a, based on some enterprise rule (such as criteria for tenure selection). For example, assume that human resource 210a is a professor in a university who is due for tenure consideration, while human resources 210a-b are too junior for such consideration. If selection to work with workgroup 208 via cohort 206a would be beneficial to human resource 210a, then that person would be given preference (e.g., would be assigned a higher weight) to join cohort 206a. Thus, a balance is struck between the needs of the cohort/workgroup/project and the needs of the individual person under consideration for inclusion in the cohort 206a.

Figure 4:
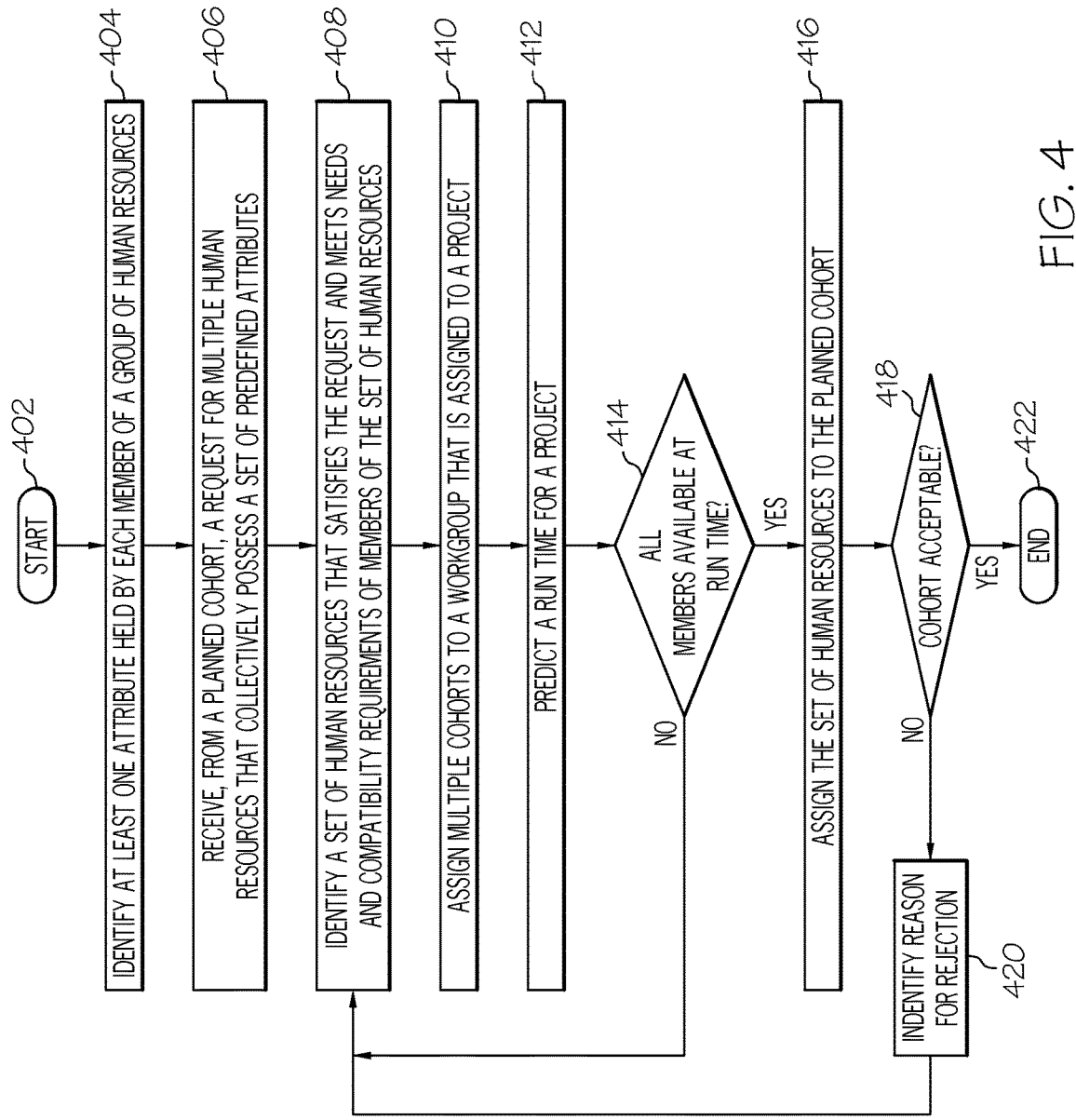
FIG. 4 is a high level flow chart of one or more exemplary actions taken by a processor to allocate human resources to different cohorts.

With reference now to FIG. 4, a high level flow chart of one or more exemplary actions performed by a processor to allocate human resources to different cohorts is presented. After initiator block 402, which may be prompted by managers of a project determining that there is a need for a multi-cohort workgroup, at least one attribute held by each member of a group of human resources is identified (block 404). In one embodiment of the present disclosure, this group of human resources is initially a set of human resources that are assumed, if not known, to be available to work on the project. As described herein, these attributes can be educational credentials, licenses, work histories, life experiences, skills, tools/equipment (i.e., specialized research equipment, a car, etc.) that is owned or under the control of a particular person, reputations/awards/honors, etc. In one embodiment, allocating/assigning/identifying attributes to specific individuals (members of the group of human resources) is performed by crawling available databases, both private and public. For example, logic can crawl every paper (including private publications and/or public publications) written by an individual. The crawling logic will search for certain key words/phrases that indicate that this individual has an interest and/or expertise in the project for which human resources are being recruited. Other databases include audio recordings (by using a voice-to-text translation or speech recognition logic); biographical descriptions from papers, websites, seminars, etc.; resumes/curricula vitae of the individual; mention of the individual by name in a study, news article, etc.

In one embodiment, if the databases being crawled are writings/speeches by the individual, then keyword searches can be for words from a particular field's specialized lexicon. For example, assume that an individual has used the term "nyctalopia", which means "night blindness." Since "nyctalopia" is not a commonly used word, an assumption can be made by computer logic that the person who used the term has an interest and/or an expertise in ophthalmology/optometry. In this example, therefore, the attribute "Interest and/or Expertise in Vision" would be assigned to that individual by the computer logic/processor.

In one embodiment, an individual's interest/expertise can be determined by the frequency, consistency, and/or longevity of terminology usage in available databases. For example, assume that crawling available databases reveals three individuals who use a certain predetermined term. A first person has been consistently (year after year) using the term in nearly all of his writings/speeches during the past twenty years. A second person used the term frequently twenty years ago, but has not used it since then. A third person used the term frequently during the current year, but had never used the term before. In this example, computer logic can conclude that the person with the highest level of interest/expertise in the subject associated with the crawled term is the first person, due to the long and consistent use of the term. The third person would have the next highest level of interest/expertise, since that person has demonstrated a current interest in the field through her writings/speeches. The second person would have an interest level of interest/expertise below that of the third person, since the second person apparently is no longer interested in the field. Of course, all three persons presumptively show a higher level of interest/expertise than anyone who has never used the term at all. Note that additional computer logic is used to recognize archaic terms. That is, if the crawling logic is looking for "Term A" (e.g., "Pertussis"), which used to be called "Term B" (e.g., "Whooping Cough"), then the crawling logic will use a mapping logic between these two terms in order to search for both terms.

Note that crawling of publications can also include an attribute weight value based on the document from which selected terms are identified. For example, assume that "Term A", which has been deemed to be indicative of an interest in "Topic X", has been used by a first individual in "Prestigious Journal", while the same term has been used by a second individual in "Disreputable Journal". In this example, a higher weighting is given to the attribute of "Interest/Expertise in Topic X" for the first individual over the second individual. Therefore, the first individual will be chosen over the second individual to meet the attribute requirement of "Interest/Expertise in Topic X" for a certain project.

Note further that the source of the databases being crawled may be kept secret. That is, while crawling logic may have access to a database that is sensitive, if not actually security protected, the identity of that database should be shielded from non-crawling logic. For example, assume that the crawling logic located a term, used by an individual, which indicates that individual's interest in a particular field/topic/subject area, and that the term usage by that individual was from an enterprise's internal accounting system. Details of what is in this database may be required, by rules/regulations/statute/policy, to be kept confidential. Thus, while the crawling logic can use the database to assign an attribute (i.e., "Interest/Expertise in Corporate Financial Write-offs") to an individual, the crawling logic should not identify the database itself, since doing so may reveal insider information about the enterprise's finances.

The various embodiments described in the database crawling discussed herein describe a predetermined significance rule. Examples of such predetermined significance rules described herein include frequency, longevity, and consistency of usage; usage in weighted publications; usage of arcane terms; etc.

A request is received for multiple human resources that collectively possess a set of predefined attributes (block 406). The request may be received from a planned cohort (e.g., element 206a shown in FIGS. 2-3), which is in the planning stage for future use. As depicted herein, no individual person holds all of the needed (predefined) attributes. Therefore, a decision is made as to which individuals are selected for inclusion in a set of individuals that collectively meet the needs of the project/workgroup/cohort. As described herein, this set of individuals (human resources) is identified based on the set's ability to meet the needs of the workgroup/cohort/project, as well as to meet the needs of the individuals (block 408). In one embodiment, the needs of the individuals include their compatibility requirements. For example, certain individuals may not be able to work together because they have ethical conflicts of interest, they live in vastly different time zones (e.g., on opposite sides of the world), they have different work calendars that are difficult, if not impossible to reconcile, etc. For example, one individual may work from a school year calendar, while another may work from a multi-year project calendar, while another may work from a unique fiscal year calendar, and another may work from a traditional (January-December) calendar. These calendars provide different work, vacation, budget, etc. considerations, which may not be compatible.

In one embodiment, certain individuals may be highly compatible if their different attributes (e.g., skill sets) complement one another, if they speak the same language (or are able to provide language interpretation skills to the cohort), if they have a shared interest in the project, etc. For example, assume that a cohort is made up of ten individuals, where four speak only Spanish and four speak only English. The remaining two individuals may be given a higher weighting (indicating their value to the cohort) if they are able to translate between the Spanish speakers and the English speakers, even though this skill set if not one of the set of predetermined attributes called for by the workgroup/project.

In one embodiment, the individual needs (including interests in certain project areas, need to be part of a project in order to further the individual's career, desire to work with certain named individuals, etc.) are received by a human resource allocating system by user-inputs from different human resources.

Continuing with block 408, there may be occasions in which the requisite human resources are not available within an initial community. In this situation, the needed human resources can be created (by new hires, new training, contracting out, etc.), subject to financial limitations. Alternatively, the human resource allocation logic can redefine the set of predefined attributes needed by the project/workgroup/cohort. For example, assume that the project states that three medical doctors are needed for a research project. If only two medical doctors are available within a pool of human resources, then the human resource allocation logic may 1) suggest to a project manager or 2) decide on its own (based on predefined constraints) that the third member of the cohort may be a doctor of osteopathic medicine, a nurse practitioner, etc.

With further reference to block 408, the needs of the individual also include a consideration of the type of project/cohort to which they will be assigned. For example, certain projects (e.g., establishing a set of standards for a new technology) could be considered by most cohort candidates as being more onerous than a project to evaluate proposed convention locations at various resorts around the world. Thus, if a person has dutifully served on one or more onerous projects, then that person would be given priority to participate in a project that is deemed more desirable, either by general consensus (e.g., resort shopping) or by the individual's own stated preferences.

As depicted in block 410, multiple cohorts are defined and assigned to the workgroup. In one embodiment, each cohort satisfies at least one unique need of a project to which the workgroup is assigned. For example, assume that the project is a medical research project. A first cohort may be made up of individual having certain medical conditions being studied, while a second cohort may be made up of health care providers who will be giving physical examinations to the persons in the first cohort, and a third cohort may be made up of information technology (IT) experts who will be collecting and analyzing data resulting from the physical examinations. Thus, the functions of the multiple cohorts are defined and assigned to the workgroup for use on the project. In another embodiment, a single cohort may satisfy several needs of the project (e.g., a single cohort includes both medical professionals as well as IT experts).

As depicted in block 412, a run time (e.g., start date through completion date) for a project can be predicted. A determination is then made (query block 414) as to whether all members of the proposed cohorts will be available when the project actually starts/ends in the future. If all members of a particular cohort will not be available, then a new cohort will be created (block 408), either predictively or at the actual run time. Whether the new cohort is created predictively or at run time, predicting which human resources will be available can be based on historical data (e.g., how many persons having certain attributes have become available at a same time of each of the past five years). For example, assume that a determination has been made that a cohort will need four electron microscope operators at run time, which will be two years in the future. For each of the past five years, a school's graduate program has received, at the beginning of each new school year, at least ten new students who are electron microscope operators. Thus, a reasonable/safe prediction is that there will be at least four electron microscope operators who will be available to the cohort at run time in the next year or two.

Once a determination is made that all members of the set of human resources are (or will be) available at run time, then this set of human resources are assigned to the planned cohort for use by the workgroup with the project (block 416).

A query is then made to determine if the cohort is acceptable (query block 418). This acceptance may come from a manager of a project, who may not explain why a cohort was accepted/rejected. That is, a manager of a project may simply reply with "Reject" when presented a cohort that has been assembled by the computer logic without giving an explanation for the rejection. In one embodiment, the reason for the rejection is determined by computer heuristics. For example, assume that all of the set of predefined attributes required for the project, as well as the needs of the individuals, have been met. However, there are still some unknown attributes that may or may not be useful to the project and/or in meeting the needs of the individuals. For example, a certain individual may bring to the project contacts, traits, etc. that are either useful or detrimental. If the cohort is repeatedly deemed unacceptable whenever this individual is part of the cohort, then the computer logic will "learn" not to include that individual in future cohorts (block 420). Similarly, if all or most cohorts that include a certain individual (e.g., a well connected and/or particularly well-respected individual) are deemed acceptable by a project manager, then computer logic will try to include that individual in future cohorts. The process ends at terminator block 422.

Note that in one embodiment of the present disclosure a cohort is dynamic. That is, members can come into and leave a cohort before and/or during the project, even though the requirements of the project may remain fixed. In this embodiment, newly arriving members of the cohort go through the same analysis described above, such that existing members of a cohort may need to be removed if an optimal combination of members (i.e., members having the needed attributes) is obtained by evicting existing members from the cohort.

Note further that, in one embodiment of the present disclosure, cohort population includes predictions of needs of future cohorts. For example, assume that a computer logic "knows" that additional cohorts will be needed for near or distant future projects. Thus, an "optimal" or "dream team" current cohort may need to be broken up for a present project, in order to keep some of the members of the current cohort available to work on future projects.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of allocating human resources to a cohort, the computer implemented method comprising:

a processor identifying at least one attribute held by each member of a group of human resources;

the processor receiving, from a planned cohort, a request for multiple human resources that collectively possess a set of predefined attributes, wherein no single human resource possesses all of the predefined attributes;

the processor assigning multiple cohorts to a workgroup, wherein each of the multiple cohorts satisfies at least one unique need of a project to which the workgroup is assigned, wherein the project is in a particular field;

the processor data mining on-line content by using a crawling logic to identify every paper written by a candidate cohort member, wherein the crawling logic identifies said every paper written by the candidate cohort member and available from an on-line database, and wherein the crawling logic blocks an identity of the on-line database from being revealed to non-crawling logic;

the processor determining, based on the data mining, that the candidate cohort member used a term from a specialized lexicon of a particular field in every paper written by the candidate cohort member during a current year in which the data mining occurred;

the processor determining, based on the data mining, that the candidate cohort member never used the term from the specialized lexicon of the particular field in any paper written by the candidate cohort member before the current year in which the data mining occurred;

the processor, in response to the data mining determining that the candidate cohort member used the term from the specialized lexicon of the particular field in every paper written by the candidate cohort member during a current year in which the data mining occurred, and in response to the data mining determining that the candidate cohort member never used the specialized lexicon of the particular field in any paper written by the candidate cohort member before the current year in which the data mining occurred, assigning the candidate cohort member to the planned cohort to create an updated planned cohort;

the processor receiving a request for data that describes the updated planned cohort from a requester; and the processor, in response to receiving the request for the data that describes the updated planned cohort, transmitting the data that describes the updated planned cohort to the requester.

2. The computer implemented method of claim 1, further comprising:
the processor predicting a run time for the project, wherein the run time comprises a start date and a completion date for the project;
the processor predicting run time availability of members of the set of human resources;
the processor determining if all members of the set of human resources will be available at run time; and
the processor, in response to determining that all members of the set of human resources will not be available at run time, identifying a new set of human resources in which all members will be available at run time to satisfy the request.

3. The computer implemented method of claim 1, further comprising:
the processor determining that working on the project would be more professionally beneficial to a first human resource candidate than a second human resource candidate; and
the processor matching the first human resource candidate to the cohort based on said at least one unique need of the project and said determining that working on the project would be more professionally beneficial to the first human resource candidate.

4. The computer implemented method of claim 3, further comprising:
the processor receiving a user-input that identifies the need of the particular human resource.

5. The computer implemented method of claim 3, wherein the project is for an enterprise, and wherein the computer implemented method further comprises:
the processor identifying the need of the particular human resource based on an enterprise rule.

6. The computer implemented method of claim 1, further comprising:
the processor identifying compatibility requirements of members of the planned cohort, wherein at least one of the compatibility requirements is based on two or more members having no ethical conflicts of interest by working together with one another; and
the processor assigning compatible members to the planned cohort.

7. The computer implemented method of claim 6, wherein the compatibility requirements are further based on complementary attributes of the members of the planned cohort.

8. The computer implemented method of claim 6, wherein the compatibility requirements are further based on different work calendars of the members of the planned cohort.

9. The computer implemented method of claim 1, wherein at least one of the predefined attributes is a specific type of license held by a human resource.

10. The computer implemented method of claim 1, wherein at least one of the predefined attributes is a predefined level of education of a human resource.

11. The computer implemented method of claim 1, wherein at least one of the predefined attributes is a predefined physical device owned by a human resource.

12. The computer implemented method of claim 1, wherein at least one of the predefined attributes is a predefined medical condition of a human resource.

13. The computer implemented method of claim 1, further comprising:
the processor assigning a weight to each prospective member of the group of human resources, wherein the weight describes how valuable each prospective member is to the planned cohort based on the set of predefined attributes; and
the processor assigning members to the planned cohort based on assigned weights.

14. A computer program product for allocating human resources to a cohort, the computer program product comprising a non-transitory computer readable storage medium having program instructions embodied therewith, the program instructions readable and executable by a processor to cause the processor to:
identify at least one attribute held by each member of a group of human resources;
receive, from a planned cohort, a request for multiple human resources that collectively possess a set of predefined attributes, wherein no single human resource possesses all of the predefined attributes;
assign multiple cohorts to a workgroup, wherein each of the multiple cohorts satisfies at least one unique need of a project to which the workgroup is assigned, wherein the project is in a particular field;
data mine on-line content by using a crawling logic to identify every paper written by a candidate cohort member, wherein the crawling logic identifies said every paper written by the candidate cohort member and available from an on-line database, and wherein the crawling logic blocks an identity of the on-line database from being revealed to non-crawling logic;

determine, based on the data mining, that the candidate cohort member used a specialized lexicon of a particular field in every paper written by the candidate cohort member during a current year in which the data mining occurred;

determine, based on the data mining, that the candidate cohort member never used the specialized lexicon of the particular field in any paper written by the candidate cohort member before the current year in which the data mining occurred;

in response to the data mining determining that the candidate cohort member used the term from the specialized lexicon of the particular field in every paper written by the candidate cohort member during a current year in which the data mining occurred, and in response to the data mining determining that the candidate cohort member never used the specialized lexicon of the particular field in any paper written by the candidate cohort member before the current year in which the data mining occurred, assign the candidate cohort member to the planned cohort;

receive a request for data that describes the updated planned cohort from a requester; and in response to receiving the request for the data that describes the updated planned cohort, transmit the data that describes the updated planned cohort to the requester.

15. The computer program product of claim 14, wherein the program instructions, when read and executed by the processor, further cause the processor to:

assign multiple cohorts to a workgroup, wherein each of the multiple cohorts satisfies at least one unique need of a project to which the workgroup is assigned.

16. A computer system comprising:

one or more processors;

one or more non-transitory computer readable memories operably coupled to the one or more processors; and program instructions stored on at least one of the one or more non-transitory computer readable storage mediums for execution by at least one of the one or more processors via at least one of the one or more non-transitory computer readable memories, the program instructions comprising:

program instructions configured to identify at least one attribute held by each member of a group of human resources;

program instructions configured to receive, from a planned cohort, a request for multiple human resources that collectively possess a set of predefined attributes, wherein no single human resource possesses all of the predefined attributes;

program instructions configured to assign multiple cohorts to a workgroup, wherein each of the multiple cohorts satisfies at least one unique need of a project to which the workgroup is assigned, wherein the project is in a particular field;

program instructions configured to data mine on-line content by using a crawling logic to identify every paper written by a candidate cohort member, wherein the crawling logic identifies said every paper written by the candidate cohort member and available from an on-line database, and wherein the crawling logic blocks an identity of the on-line database from being revealed to non-crawling logic;

program instructions configured to determine, based on the data mining, that the candidate cohort member used a specialized lexicon of a particular field in every paper written by the candidate cohort member during a current year in which the data mining occurred;

program instructions configured to determine, based on the data mining, that the candidate cohort member never used the specialized lexicon of the particular field in any paper written by the candidate cohort member before the current year in which the data mining occurred;

program instructions configured to, in response to the data mining determining that the candidate cohort member used the term from the specialized lexicon of the particular field in every paper written by the candidate cohort member during a current year in which the data mining occurred, and in response to the data mining determining that the candidate cohort member never used the specialized lexicon of the particular field in any paper written by the candidate cohort member before the current year in which the data mining occurred, assign the candidate cohort member to the planned cohort;

program instructions configured to receive a request for data that describes the updated planned cohort from a requester; and program instructions to, in response to receiving the request for the data that describes the updated planned cohort, transmit the data that describes the updated planned cohort to the requester.

17. The computer system of claim 16, wherein the program instructions further comprise:

program instructions configured to assign multiple cohorts to a workgroup, wherein each of the multiple cohorts satisfies at least one unique need of a project to which the workgroup is assigned.

* * * * *